(12) United States Patent
Ahn et al.

(10) Patent No.: US 8,942,653 B2
(45) Date of Patent: Jan. 27, 2015

(54) APPARATUS AND METHOD FOR LOW POWER AMPLIFICATION IN A WIRELESS COMMUNICATION SYSTEM

(75) Inventors: Cheol-Woo Ahn, Suwon-si (KR); Kweon Na, Yongin-si (KR); Kae-Oh Sun, Uiwang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1443 days.

(21) Appl. No.: 12/109,720

(22) Filed: Apr. 25, 2008

(65) Prior Publication Data
US 2008/0268797 A1  Oct. 30, 2008

(30) Foreign Application Priority Data
Apr. 27, 2007  (KR) .................. 10-2007-0041358

(51) Int. Cl.
*H04B 1/04*  (2006.01)
*H01Q 3/30*  (2006.01)
*H01Q 21/00*  (2006.01)
*H04B 7/06*  (2006.01)

(52) U.S. Cl.
CPC ............. *H01Q 3/30* (2013.01); *H01Q 21/0025* (2013.01); *H04B 7/0617* (2013.01)
USPC ...................................... 455/129; 455/127.1

(58) Field of Classification Search
CPC ..... H04B 7/086; H04B 7/0617; H04B 7/0686
USPC ....................... 455/101, 129, 121–124, 127.1
See application file for complete search history.

(56) References Cited

U.S. PATENT DOCUMENTS

| | | | |
|---|---|---|---|
| 6,252,542 B1 | 6/2001 | Sikina et al. | |
| 2001/0005685 A1 | 6/2001 | Nishimori et al. | |
| 2002/0042290 A1 | 4/2002 | Williams et al. | |
| 2003/0146880 A1* | 8/2003 | Chiang et al. | 343/853 |
| 2003/0156061 A1 | 8/2003 | Ohira | |
| 2004/0204109 A1* | 10/2004 | Hoppenstein | 455/562.1 |
| 2006/0077102 A1* | 4/2006 | Mohamadi | 343/700 MS |
| 2007/0037528 A1* | 2/2007 | Doan et al. | 455/101 |
| 2007/0268193 A1* | 11/2007 | Petersson et al. | 343/756 |

* cited by examiner

*Primary Examiner* — Christian Hannon
(74) *Attorney, Agent, or Firm* — Jefferson IP Law, LLP (57) ABSTRACT

An apparatus and a method for beamforming with less heat in a wireless communication system including multiple antennas are provided. The apparatus includes a digital signal processor for processing at least one baseband digital signal, and at least one Radio Frequency (RF) signal processor for converting a respective baseband digital signal of the at least one baseband digital signal into an RF analog signal and for amplifying a power of the RF analog signal for one or more antenna elements constituting a respective antenna of the at least one antenna.

12 Claims, 6 Drawing Sheets

APPARATUS AND METHOD FOR LOW POWER AMPLIFICATION IN A WIRELESS COMMUNICATION SYSTEM

PRIORITY

This application claims the benefit under 35 U.S.C. §119 (a) of a Korean patent application filed in the Korean Intellectual Property Office on Apr. 27, 2007 and assigned Serial No. 2007-41358, the entire disclosure of which is hereby incorporated by reference.

BACKGROUND OF THE INVENTION

1. Field of the Invention

The present invention relates generally to an apparatus and a method for reducing heat in a wireless communication system. More particularly, the present invention relates to an apparatus and a method for reducing heat when forming a beam in the wireless communication system including a directional antenna.

2. Description of the Related Art

A base station of a wireless communication system includes a transceiver for processing transmitted and received signals, and an antenna for emitting a transmission signal and receiving a signal over the air. The transceiver includes a digital signal processor for processing a digital signal and an analog signal processor for processing an analog signal. The transceiver and the antenna are connected using a Radio Frequency (RF) cable. Accordingly, the base station is subject to loss from the RF cable. For example, when transmitting a signal, a power amplifier of the transmitter needs to amplify the signal to compensate for the loss of the RF cable. In doing so, a system cost increases. When the receiver receives a signal, the loss of the RF cable increases prior to a low noise amplifier. Thus, the noise of the receive signal also increases, thereby degrading system performance.

Figure 1:
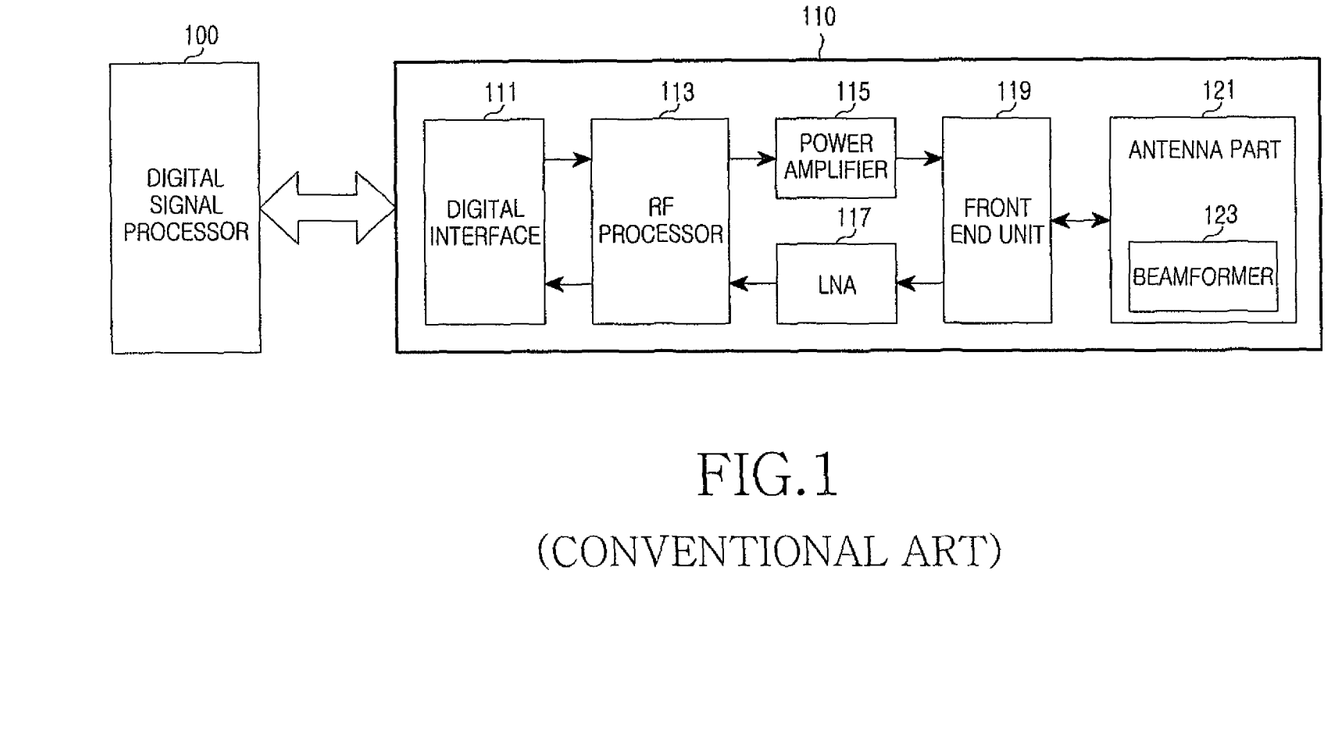
FIG. 1 illustrates a block diagram of a transceiver in a conventional wireless communication system.

To address the disadvantages of the RF cable in a conventional wireless communication system, the base station is constructed by combining the antenna and the analog signal processor as shown in FIG. 1.

FIG. 1 illustrates a block diagram of a transceiver in a conventional wireless communication system. Hereafter, the base station of the wireless communication system is illustrated by way of example.

The base station of FIG. 1 includes a digital signal processor 100 and an RF signal processor 110.

The digital signal processor 100 processes a digital signal, to be sent, in baseband and provides the processed digital signal to the RF signal processor 110. The digital signal processor 100 also processes a baseband digital signal output from the RF signal processor 110.

The RF signal processor 110 includes a digital interface 111, an RF processor 113, a power amplifier 115, a Low Noise Amplifier (LNA) 117, a front end unit 119, and an antenna 121.

The digital interface 111 converts the digital signal fed from the digital signal processor 100 into an analog signal and outputs the analog signal to the RF processor 113. The digital interface 111 also converts an analog signal output from the RF processor 113 into a digital signal and outputs the digital signal to the digital signal processor 100.

The RF processor 113 converts the baseband signal output from the digital interface 111 into an RF signal and outputs the RF signal to the power amplifier 115. The RF processor 113 also converts an RF signal output from the LNA 117 into a baseband signal and outputs the baseband signal to the digital interface 111.

The power amplifier 115 amplifies the signal output from the RF processor 113 so as to transmit the transmission signal to a receiving end through a radio resource.

The LNA 117 amplifies the signal output from the front end unit 119 by reducing the noise of the signal.

The front end unit 119 separates a transmission path and a reception path. To transmit a signal, the front end unit 119 provides the signal from the power amplifier 115 to the antenna 121. To receive a signal, the front end unit 119 provides the signal from the antenna part 121 to the LNA 117.

The front end unit 119 eliminates spurious waves in a band other than the frequency band of the signal transmission and reception.

The antenna part 121 emits the transmission signal output from the front end unit 119 over the air or receives a radio signal and provides the received signal to the front end unit 119. When the antenna part 121 is implemented using a directional antenna, the antenna part 121 changes a phase and a gain with respect to the signal path of the antenna using a beamformer 123.

As discussed above, the wireless communication system includes the digital signal processor 100 and the RF signal processor 110 which are separated from each other. The wireless communication system can address the shortcomings of the RF cable by digitizing the connection between the digital signal processor 100 and the RF signal processor 110.

However, when the antenna and the analog signal processor are unified as a single module in the wireless communication system, the analog signal processor may be exposed to the elements. In this case, the analog signal processor may suffer from heat caused by solar radiation.

When beamforming, the beamformer 123 of the wireless communication system changes the phase and the gain of the signals, of which the power is amplified by the power amplifier, in the paths of the antennas. For doing so, the wireless communication system needs to construct the beamformer 123 with elements capable of processing the signal which has been amplified by the power amplifier. As a result, system cost is increased.

SUMMARY OF THE INVENTION

An aspect of the present invention is to address at least the above mentioned problems and/or disadvantages and to provide at least the advantages described below. Accordingly, an aspect of the present invention is to provide an apparatus and a method for reducing heat in a wireless communication system.

Another aspect of the present invention is to provide an apparatus and a method for reducing heat using a low power amplifier for each antenna element in a wireless communication system.

Yet another aspect of the present invention is to provide an apparatus and a method for enhancing a performance of a beamformer by disposing the beamformer at a front end of a low power amplifier in a wireless communication system including a directional antenna.

The above aspects are addressed by providing a transmitter of a wireless communication system which comprises at least one antenna. The transmitter includes a digital signal processor for processing a baseband digital signal; and at least one Radio Frequency (RF) signal processor for converting the baseband digital signal to be sent over antenna, to an RF analog signal and amplifying a power of the analog signal for one or more antenna elements constituting the antenna. The apparatus includes a digital signal processor for processing at least one baseband digital signal, and at least one Radio Frequency (RF) signal processor for converting a respective baseband digital signal of the at least one baseband digital signal into an RF analog signal and for amplifying a power of the RF analog signal for one or more antenna elements constituting a respective antenna of the at least one antenna According to one aspect of the present invention, a receiver of a wireless communication system which comprises at least one antenna includes at least one Radio Frequency (RF) signal processor for converting an RF analog signal received on a respective antenna of the at least one antenna into a baseband digital signal by low noise amplifying the RF analog signal based on one or more antenna elements constituting the respective at least one antenna, and a digital signal processor for processing the baseband digital signal output from the at least one RF signal processor.

According to another aspect of the present invention, a method for forming a beam in a wireless communication system which comprises at least one antenna, includes generating a phase for the beamforming by calibrating a transmission signal, changing a phase of a signal to be transmitted over one or more antenna elements constituting the at least one antenna using the generated phase, and amplifying a power of the phase-changed signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a technique for reducing heat in a wireless communication system including a directional antenna.

In the wireless communication system, an antenna of a transmitting end includes a plurality of antenna elements. To reduce the heat of a power amplifier, the transmitting end amplifies a power of a transmission signal using a low power amplifier for each antenna element as shown in FIG. 2.

Figure 2:
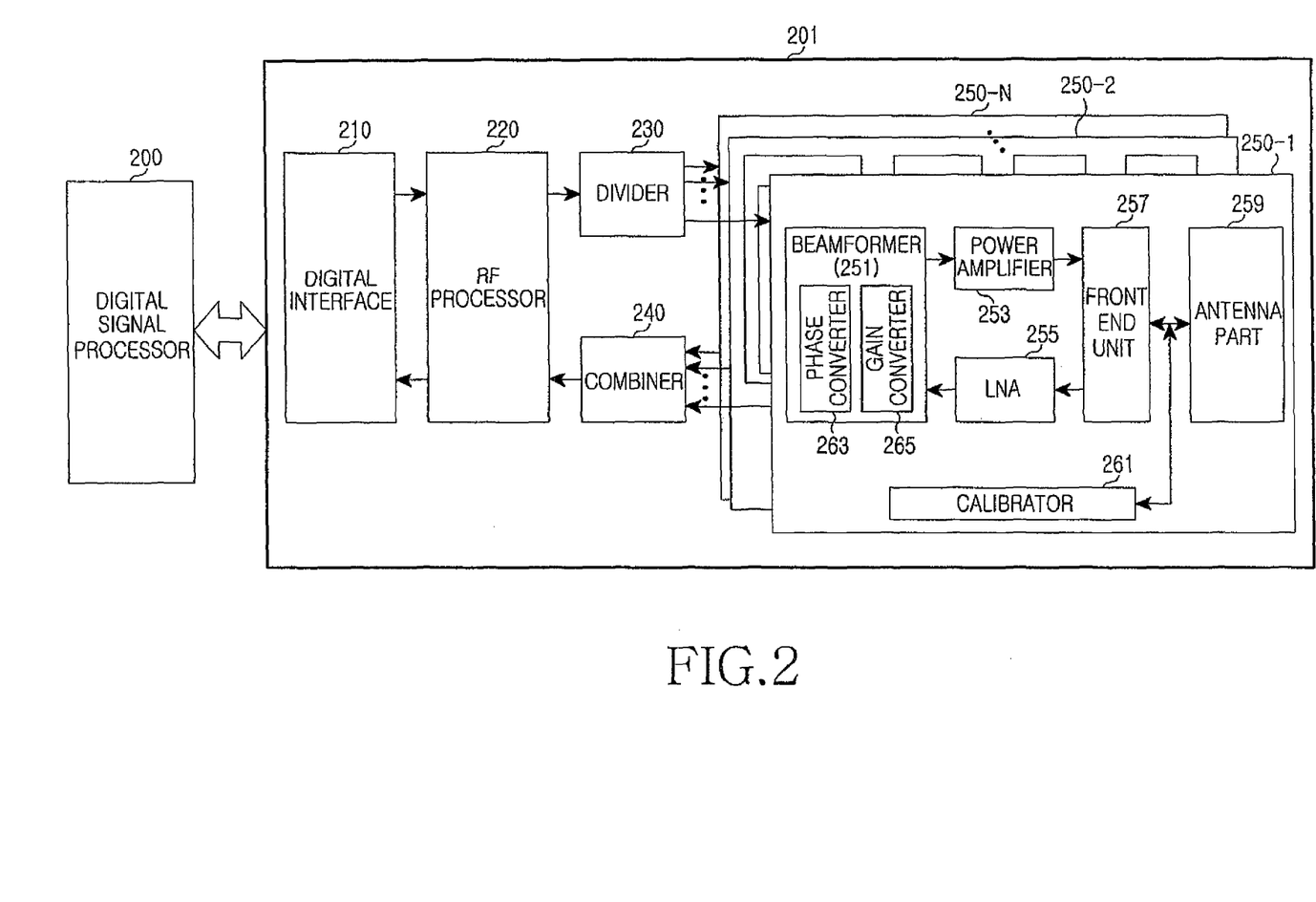
FIG. 2 illustrates a block diagram of a transceiver in a wireless communication system according to an exemplary embodiment of the present invention.

FIG. 2 illustrates a block diagram of a transceiver in a wireless communication system according to an exemplary embodiment of the present invention. Hereinafter, one antenna of the wireless communication system is illustrated by way of example.

The wireless communication system of FIG. 2 includes a digital signal processor 200 and a Radio Frequency (RF) signal processor 201.

The digital signal processor 200 processes a digital signal, to be sent, in baseband and provides the processed digital signal to the RF signal processor 201. The digital signal processor 200 also processes a baseband digital signal output from the RF signal processor 201.

The RF signal processor 201 includes a digital interface 210, an RF processor 220, a divider 230, a combiner 240, and antenna elements 250-1 through 250-N.

The digital interface 210 converts the digital signal output from the digital signal processor 200 into an analog signal and provides the analog signal to the RF processor 220. The digital interface 210 converts an analog signal output from the RF processor 220 into a digital signal and provides the digital signal to the digital signal processor 200.

The RF processor 220 converts the baseband signal output from the digital interface 210 into an RF signal and provides the RF signal to the divider 230. The RF processor 220 converts an RF signal output from the combiner 240 into a baseband signal and provides the baseband signal to the digital interface 210.

The divider 230 divides the RF signal output from the RF processor 220 and outputs the divided signals to the antenna elements 250-1 through 250-N.

The combiner 240 combines signals from the antenna elements 250-1 through 250-N and outputs the combined signal to the RF processor 220.

The antenna elements 250-1 through 250-N each include a beamformer 251, a power amplifier 253, a Low Noise Amplifier (LNA) 255, a front end unit 257, an antenna part 259, and a calibrator 261. Since the antenna elements 250-1 through 250-N are similarly constructed, only the first antenna element 250-1 is described.

The beamformer 251 includes a phase converter 263 and a gain converter 265. The beamformer 251 changes the phase and the gain of the signal provided from the divider 230 or the LNA 255 to form a beam. The phase converter 263 converts the phase of the signal fed from the divider 230 or the LNA 255 according to a phase compensation value provided from the calibrator 261. Herein, the phase converter 263 is implemented using a conventional phase shifter.

The gain converter 265 converts the gain of the signal fed from the divider 230 or the LNA 255 according to a gain compensation value provided from the calibrator 261.

As the beamformer 251 converts the phase and the gain of the low power signal which is not yet power-amplified by the power amplifier 253, the phase converter 263 can be implemented using a low power varactor diode.

The calibrator 261 detects the compensation gain and the compensation phase by calibrating the signals transmitted and received on the antenna element 250-1 and provides the gain and the phase to the beamformer 251.

The power amplifier 253 amplifies the power of the signal output from the beamformer 251. Since a power amplifier 253 is disposed in each antenna element 250-1 through 250-N to amplify the signal, the power amplifier 253 is implemented using a low power amplifier.

The LNA 255 amplifies the signal output from the front end unit 257 by reducing noise.

The front end unit 257 separates the transmission path and the reception path. For the signal transmission, the front end unit 257 forwards the signal from the power amplifier 253 to the antenna part 259. For the signal reception, the front end unit 257 forwards the signal from the antenna part 259 to the LNA 255.

The front end unit 257 eliminates spurious waves generated in a band other than the frequency band of the transceived signals.

The antenna part 259 radiates the transmission signal fed from the front end unit 257 over the air, or receives a radio signal and outputs the received signal to the front end unit 257.

To form the horizontal antenna beam, the digital signal processor 200 changes the phase $\phi$ of the signal with respect to the transmission path and the reception path. To form the vertical antenna beam, the beamformer 251 changes the phase $\theta$ of the signal with respect to the antenna elements 250-1 through 250-N.

Alternatively, to form the horizontal beam and the vertical beam of the antenna, the beamformer 251 may change the phases $\phi$ and $\zeta$ of the transmission signal.

As described above, the wireless communication system amplifies the signal on the basis of the antenna element of the antenna. Thus, even when error occurs at one power amplifier, a redundancy effect can be acquired by communicating using the other power amplifiers.

To form the beam, the wireless communication system constructed as described above operates as illustrated in FIG. 3. Herein, it is assumed that the base station for the beamforming is constructed as shown in FIG. 2.

Figure 3:
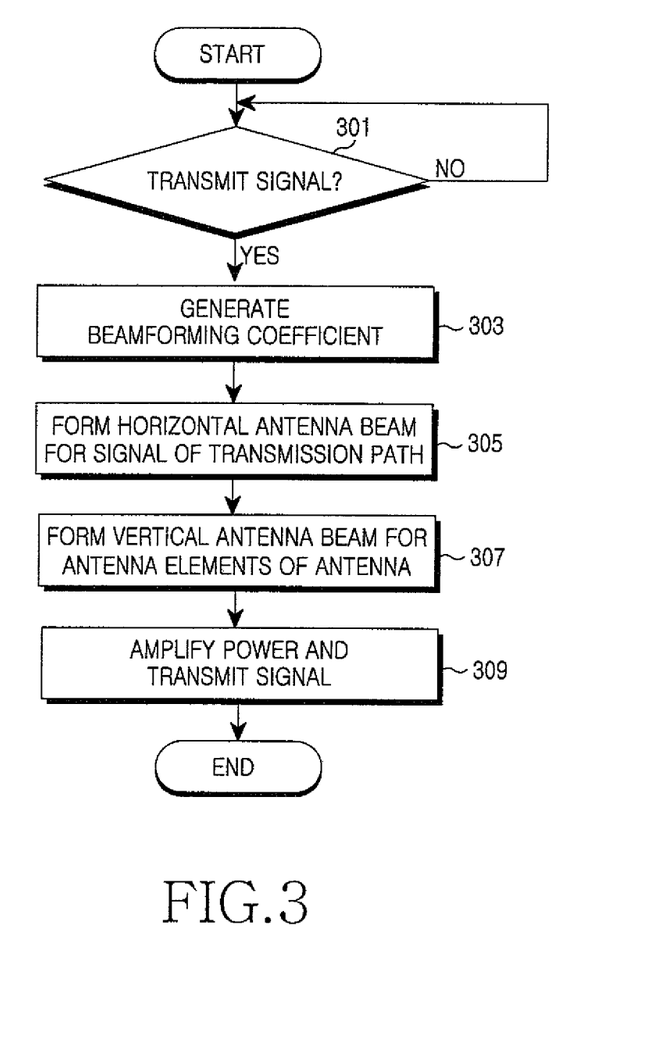
FIG. 3 illustrates a flowchart of a beamforming method in a wireless communication system according to an exemplary embodiment of the present invention.

FIG. 3 illustrates a flowchart of a beamforming method in a wireless communication system according to an exemplary embodiment of the present invention.

In step 301, the base station determines whether there is a signal to be transmitted to one or more users.

To transmit the signal, the base station generates a beam coefficient to form the beam so as to send the signal to the one or more users in step 303. For example, after establishing a feedback path, the base station generates the phase to form the horizontal antenna beam and the phase to form the vertical antenna beam by calibrating a signal fed back through the feedback path.

In step 305, the base station changes the phase of the signal of the transmission path using the phase for the horizontal antenna beamforming. For example, using the digital signal processor, the base station changes the phase of the signal to be sent over the antenna into the phase for the horizontal antenna beamforming.

Alternatively, using the beamformer, the base station changes the phase of the signal to be sent over the antenna into the phase for the horizontal antenna beamforming.

In step 307, the base station changes the phase of the signal of the antenna elements of the antenna using the phase for the vertical antenna beamforming. For example, using the beamformer, the base station changes the phase of the signals of the antenna elements of the antenna into the phase for the vertical antenna beamforming.

In step 309, the base station amplifies the power of the transmission signal of each antenna element of the antenna and then transmits the signal.

Next, the base station finishes this process.

Figure 4:
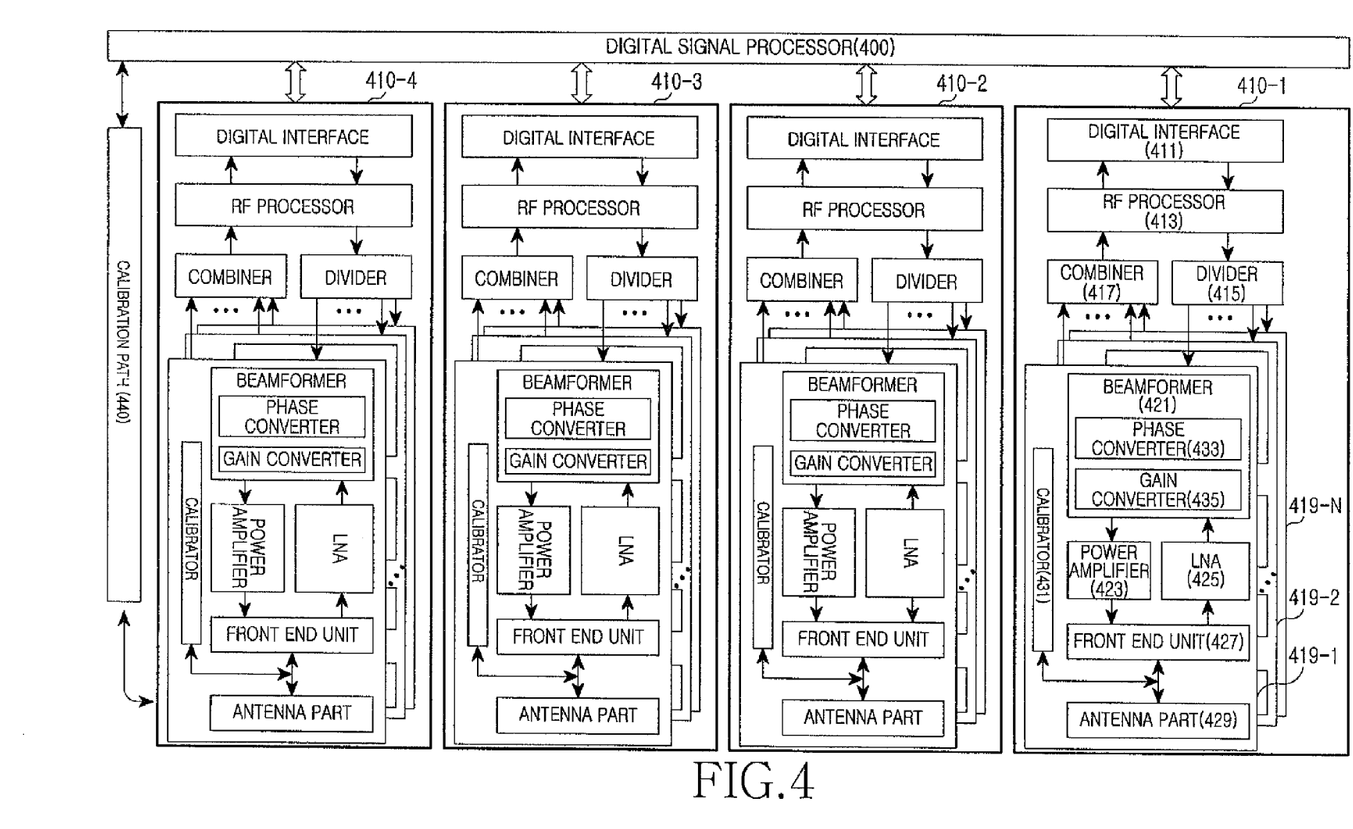
FIG. 4 illustrates a block diagram of a transceiver in a multi-antenna system according to an exemplary embodiment of the present invention.

When the wireless communication system includes four antennas, the wireless communication system is constituted as illustrated in FIG. 4.

FIG. 4 illustrates a block diagram of a transceiver in a multi-antenna system according to an exemplary embodiment of the present invention.

In the wireless communication system of FIG. 4, the transceiver includes a digital signal processor 400 and RF signal processors 410-1 through 410-4.

The digital signal processor 400 processes digital signals, to be sent, in baseband and provides the processed digital signals to the RF signal processors 410-1 through 410-4. The digital signal processor 400 processes baseband digital signals output from the RF signal processors 410-1 through 410-4.

The RF signal processors 410-1 through 410-4 each include a digital interface 411, an RF processor 413, a divider 415, a combiner 417, and antenna elements 419-1 through 419-N. Herein, the structure of the RF signal processors 410-1 through 410-4 in the antennas is similar. Accordingly, only the RF signal processor 410-1 of the first antenna is described as an example.

The digital interface 411 converts the digital signal output from the digital signal processor 400 into an analog signal and outputs the analog signal to the RF processor 413. The digital interface 411 converts an analog signal output from the RF processor 413 into a digital signal and outputs the digital signal to the digital signal processor 400.

The RF processor 413 converts the baseband signal output from the digital interface 411 into an RF signal and provides the RF signal to the divider 415. The RF processor 413 converts an RF signal output from the combiner 417 into a baseband signal and provides the baseband signal to the digital interface 411.

The divider 415 divides the RF signal output from the RF processor 413 and outputs the divided signals to the antenna elements 419-1 through 419-N respectively.

The combiner 417 combines signals from the antenna elements 419-1 through 419-N and outputs the combined signal to the RF processor 413.

The antenna elements 419-1 through 419-N each include a beamformer 421, a power amplifier 423, an LNA 425, a front end unit 427, an antenna part 429, and a calibrator 431. Herein, the structure of the antenna elements 419-1 through 419-N is similar. Thus, the first antenna element 419-1 is described as an example.

The beamformer 421 includes a phase converter 433 and a gain converter 435 for changing the phase and the gain of the signal provided from the divider 415 or the LNA 425 to form a beam. More specifically, the phase converter 433 converts the phase of the signal provided from the divider 415 or the LNA 425 according to a phase compensation value from the calibrator 431. The phase converter 433 is implemented using a conventional phase shifter.

The gain converter 435 converts the gain of the signal provided from the divider 415 or the LNA 425 according to a gain compensation value from the calibrator 431.

Since the beamformer 421 converts the phase and the gain of the low power signal before the power amplification at the power amplifier 423, the phase converter 433 can be implemented using a low power varactor diode.

The calibrator 431 detects the compensation gain and the compensation phase by calibrating the signal of the antenna element 419-1 and provides the detected gain and phase to the beamformer 421.

The power amplifier 423 amplifies the power of the signal output from the beamformer 421. As amplifying the signal for each antenna element 419-1 through 419-N, the power amplifier 423 amplifies the power of the signal using a low power amplifier.

The LNA 425 amplifies the signal output from the front end unit 427 by reducing noise.

The front end unit 427 separates the transmission path and the reception path. For the signal transmission, the front end unit 427 provides the signal from the power amplifier 423 to the antenna part 429. For the signal reception, the front end unit 427 provides the signal from the antenna part 429 to the LNA 425.

The front end unit 427 eliminates spurious waves generated in the band other than the frequency band of the transceived signals.

The antenna part 429 radiates the transmission signal output from the front end unit 427 over the air, or receives a radio signal and outputs the received signal to the front end unit 427.

To form the horizontal antenna beam, the wireless communication system changes the phase $\phi$ of the signal to be sent in the transmission and reception paths using the digital signal processor 400.

To form the vertical antenna beam, the wireless communication system changes the phase $\theta$ of the signal for the antenna elements 419-1 through 419-N using the beamformer 421.

Alternatively, to form the horizontal beam and the vertical beam of the antenna, the beamformer 421 of the wireless communication system may change the phase $\phi$ and $\theta$ of the transmission signal.

A calibration path 440 generates a compensation value for compensating for external factors such as characteristics of an environment or modules of the base station. When the wireless communication system forms the beam, it is necessary to fix the phase of the antenna output waveform to a desired value. For doing so, the calibration path 440 generates the compensation value for compensating for the external factors.

As such, the wireless communication system performs the calibration for the beamforming. For example, the wireless communication system constitutes the calibration path 400 of FIG. 4 as illustrated in FIG. 5.

Figure 5:
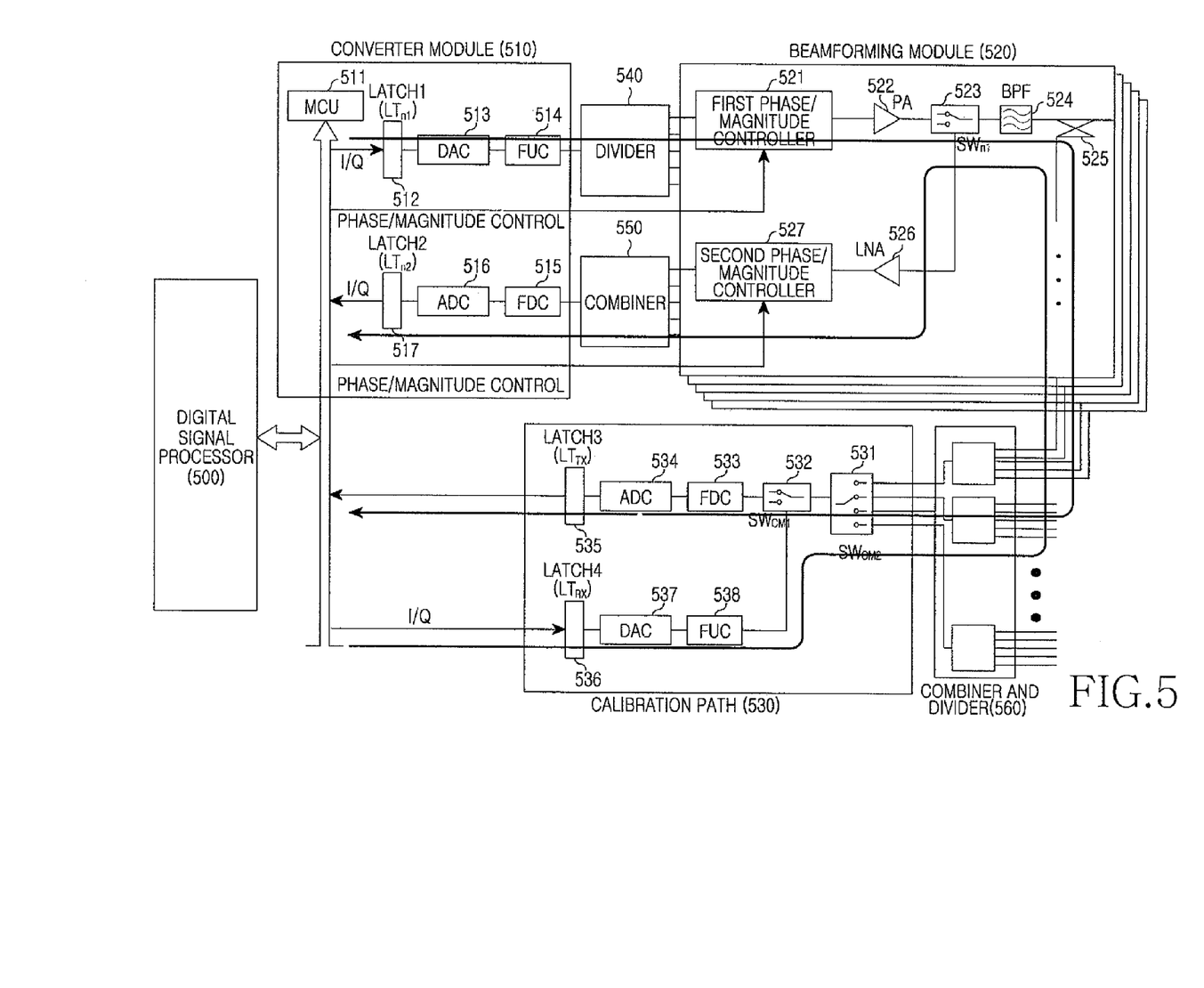
FIG. 5 illustrates a block diagram of a transceiver for compensation in a distributed array antenna according to an exemplary embodiment of the present invention.

FIG. 5 illustrates a block diagram of a transceiver for the compensation in a distributed array antenna according to an exemplary embodiment of the present invention. Hereafter, the base station including a plurality of antennas establishes the calibration path for one antenna by way of example.

The base station of FIG. 5 includes a digital signal processor 500, a converter module 510, a beamforming module 520, a calibration path 530, a power divider 540, a power combiner 550, and a power combiner and divider 560.

The digital signal processor 500 processes the digital signal, to be sent, in baseband and provides the processed digital signal to the converter module 510, and processes the baseband digital signal output from the converter module 510.

The converter module 510 includes a Micro Controller Unit (MCU) 511, a first latch 512, a Digital to Analog Converter (DAC) 513, a Frequency Up Converter (FUC) 514, a Frequency Down Converter (FDC) 515, an Analog to Digital Converter (ADC) 516, and a second latch 517.

The DAC 513 converts the digital signal output from the digital signal processor 500 into an analog signal. The FUC 514 converts the baseband signal output from the DAC 513 into an RF signal.

The FDC 515 converts an RF signal output from the power combiner 550 into a baseband signal. The ADC 516 converts the analog signal output from the FDC 515 into a digital signal.

The MCU 511 generates a compensation signal for the calibration and controls the calibration path 530

The first latch $LT_{n1}$ 512 stores phase and magnitude information of the compensation signal generated at the MCU 511. The second latch $LT_{n2}$ 517 stores phase and magnitude information of the received compensation signal.

The power divider 540 divides the RF signal output from the converter module 510 and provides the divided signals to the beamforming modules 520 respectively. The beamforming module 520 is provided for each antenna element of one antenna. The power combiner 550 combines RF signals from the beamforming modules 520 as a single signal and provides the combined signal to the converter module 510. Since the base station includes one converter module 510 in one antenna, the converter module 510 is connected to the beamforming module 520 using the power divider 540 and the power combiner 550. Note that the base station may include converter modules 510 for the respective beamforming modules 520.

The beamforming modules 520 each include a first phase and magnitude controller 521, a power amplifier 522, a first switch $SW_{n1}$ 523, a Band Pass Filter (BPF) 524, a coupler 525, an LNA 526, and a second phase and magnitude controller 527.

The first phase and magnitude controller 521 compensates for the phase and the magnitude of the transmission signal under the control of the MCU 511. The MCU 511 controls the first phase and magnitude controller 521 by taking into account the difference between the phase and magnitude information of the signal stored in the first latch 512 and the phase and magnitude information of the signal stored in a third latch 535.

The power amplifier 522 amplifies the power of the signal output from the first phase and magnitude controller 521. Since the power amplifier 522 amplifies the signal for each beamforming module 520, the power amplifier 522 may be implemented using a low power amplifier.

The first switch 523 connects the BPF 524 to the transmission or reception path according to the signal transmission or reception time. For instance, for the signal transmission, the first switch 523 connects the power amplifier 522 and the BPF 524. For the data reception, the first switch 523 connects the LNA 526 and the BPF 524.

The BPF 524 eliminates spurious waves generated in the band other than the frequency band of the transmission and the reception with respect to the signal provided from the first switch 523 or the coupler 525.

The coupler 525 couples the compensation signal output from the BPF 524 to the power combiner and divider 560. The coupler 525 provides the signal output from the power combiner and divider 560 to the BPF 524.

The LNA 526 amplifies the signal output from the first switch 523 by reducing noise.

The second phase and magnitude controller 527 compensates for the phase and the magnitude of the received signal under the control of the MCU 511. The MCU 511 controls the second phase and magnitude controller 527 by taking into account the difference between the phase and magnitude information of the signal stored in the second latch 517 and the phase and magnitude information of the signal stored in a fourth latch 536.

The power combiner and divider 560 combines the compensation signals output from the beamforming modules 520 and provides the combined signal to the calibration path 530. The power combiner and divider 560 divides the compensation signal from the calibration path 530 and provides the divided signals to the beamforming modules 520. The power combiner and divider 560 includes as many combiner and divider modules as the number of the antennas of the base station. Accordingly, the combiner and divider modules transmit and receive the compensation signal to and from the beamforming modules 520 of their corresponding antenna.

The calibration path 530 includes switches $SW_{CM1}$ 532 and $SW_{CM2}$ 531, an FDC 533, an ADC 534, the third latch 535, the fourth latch 536, a DAC 537, and an FUC 538.

The third switch $SW_{CM2}$ 531 connects to the antenna of the compensation in the calibration path 530.

The second switch $SW_{CM1}$ 532 connects the third switch 531 to the transmission or reception compensation path according to the transmission compensation or the reception compensation. For instance, for the transmission interval compensation, the second switch 532 connects the third switch 531 to the FDC 533. For the reception interval compensation, the second switch 532 connects the third switch 531 to the FUC 538.

The FDC 533 converts the RF compensation signal output from the second switch 532 into a baseband signal. The ADC 534 converts the analog signal output from the FDC 533 into a digital signal.

The third latch $LT_{TX}$ 535 stores phase and magnitude information of the transmission interval compensation signal output from the ADC 534.

The fourth latch $LT_{RX}$ 536 stores phase and magnitude information of the compensation signal generated at the MCU 511.

The DAC 537 converts the digital compensation signal output from the fourth latch 536 into an analog signal. The FUC 538 converts the baseband signal output from the DAC 537 into an RF signal.

As described above, the calibration path 530 of the base station determines the phase and the magnitude for compensating for the transmission path and the reception path for each antenna of the base station. The calibration path 530 unites or divides the transmission compensation signal and the reception compensation signal through the power combiner and divider 560. If the isolation between ports of the power combiner and divider 560 is not satisfactory, the interference between signals in the other compensation paths may degrade the accuracy of the compensation. In this respect, the base station ensures sufficient isolation between the ports using the third switch 531.

With the base station of the wireless communication system constructed as illustrated in FIG. 5, to compensate for the transmission path, the MCU 511 can determine the phase and the magnitude for calibrating the transmission path by comparing the phase and magnitude information of the compensation signal stored to the first latch 512 with the phase and magnitude information of the compensation signal stored to the third latch 535. In doing so, since all of the transmission paths connected to the converter module 510 share the same calibration path 530, the difference of the phase and the magnitude actually measured covers merely the difference between only the transmission paths, not the difference in the calibration path.

For the reception path calibration, the MCU 511 can determine the phase and the magnitude for calibrating the reception path by comparing the phase and magnitude information of the compensation signal stored in the second latch 517 with the phase and magnitude information of the compensation signal stored in the fourth latch 536. In doing so, since all of the reception paths connected to the converter module 510 share the same calibration path 530, the difference of the phase and the magnitude actually measured covers merely the difference between only the reception paths, not the difference in the calibration path.

The group delay between the RF circuits of FIG. 5 may vary up to tens of picoseconds (ps), whereas the ADC or the DAC is subject to the group delay up to several nanoseconds (ns). When the frequency of the baseband signal is low, the group delay from the ADC or the DAC exerts relatively little influence on the phase difference. Hence, the group delay can be compensated by the phase shifter after passing through a mixer.

Figure 6:
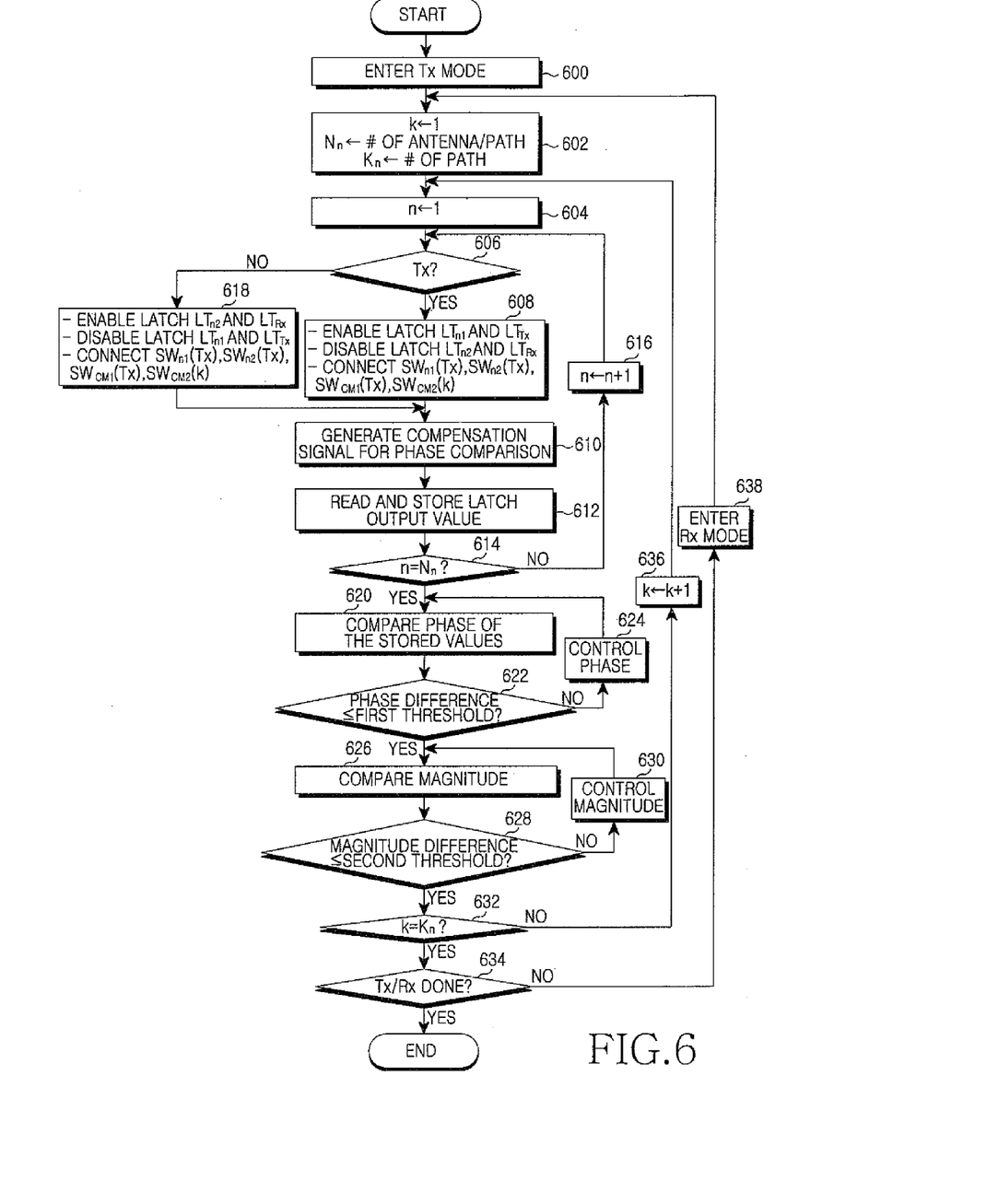
FIG. 6 illustrates a flowchart of operations of a transceiver for compensation in a distributed array antenna according to an exemplary embodiment of the present invention.

FIG. 6 illustrates a flowchart of operations of a transceiver for the compensation in a distributed array antenna according to an exemplary embodiment of the present invention.

In step 600, the transceiver enters a Tx compensation mode to compensate for the transmission path.

In step 602, the transceiver sets the number $N_n$ of the antenna elements for constituting one path and the number $K_n$ of the paths for the transceiver to transmit and receive signals, and initializes a first coefficient k. Herein, $K_n$ equals the number of the antennas of the transceiver. The first coefficient indicates an index of the transmission or reception path.

In step 604, the transceiver initializes a second coefficient n. The second coefficient indicates an index of the antenna element.

In step 606, the transceiver confirms the path for the compensation. In more detail, the transceiver determines whether to compensate for the Tx path or the Rx path.

To compensate for the Tx path, the transceiver activates the latch (e.g., the first latch 512) of the Tx path and the latch (e.g., the third latch 535) of the Rx path of the calibration path in step 608. At this time, the transceiver deactivates the latch (e.g., the second latch 517) of the Rx path and the latch (e.g., the fourth latch 536) of the Tx path of the calibration path. The transceiver controls the switches to link the Tx path and the Rx path of the calibration path.

In step 610, the transceiver generates the compensation signal to determine the phase and the magnitude so as to compensate for the Tx path.

In step 612, the transceiver stores the phase and magnitude information of the generated compensation signal and the compensation signal which passed through the Tx path, in the respective latches. Specifically, the transceiver stores the phase and magnitude information of the generated compensation signal in the latch (e.g., the first latch 512) of the Tx path, and stores the phase and magnitude information of the compensation signal which passed through the Tx path in the latch (e.g., the third latch 535) of the Rx path of the calibration path.

In step 614, the transceiver determines whether the phase and magnitude information of the compensation signal is confirmed with respect to the Tx path of every antenna element of the $k^{th}$ Tx path. That is, the transceiver compares the second coefficient with $N_n$.

When the phase and the magnitude information of the compensation signal of the Tx path of every antenna element is not confirmed, the transceiver increases the second coefficient in step 616.

Next, the transceiver returns to step 606 and determines the phase and magnitude information of the compensation signal for the Tx path of the $n^{th}$ antenna element.

By contrast, when the phase and the magnitude information of the compensation signal of the Tx path of every antenna element is confirmed, the transceiver compares the phase of the values stored to the corresponding latches in step 620. For instance, the transceiver compares the phase stored in the latch of the Tx path with the phase stored in the latch of the Rx path of the calibration path.

In step 622, the transceiver compares the phase difference with a first threshold.

When the phase difference is greater than the first threshold, the transceiver controls the phase in step 624. Namely, the transceiver calibrates the phase in the Tx path.

When the phase difference is equal to or less than the first threshold, the transceiver compares the magnitude of the values stored in the corresponding latches in step 626. For example, to compensate for the Tx path, the transceiver compares the magnitude stored in the latch of the Tx path with the magnitude stored in the latch of the Rx path of the calibration path.

In step 628, the transceiver compares the magnitude difference with a second threshold.

When the magnitude difference is greater than the second threshold, the transceiver controls the magnitude in step 630. Namely, the transceiver calibrates the magnitude in the Tx path.

When the magnitude difference is equal to or less than the second threshold, the transceiver determines whether every Tx path is calibrated in step 632. When every Tx path is not calibrated, the transceiver updates the first coefficient in step 636. In more detail, the transceiver updates the first coefficient in order to calibrate the other Tx paths. Next, the transceiver returns to step 604 and calibrates the $k^{th}$ Tx path.

When every Tx path is calibrated, the transceiver determines whether both of the Tx path and the Rx path are calibrated in step 634.

When only the Tx path is calibrated, the transceiver enters the Rx compensation mode in step 638. Next, the transceiver calibrates the Rx path in step 602. In step 602, the transceiver sets the number $N_n$ of the antenna elements constituting one path and the number $K_n$ of the paths for the transceiver to transmit and receive signals, and initializes the first coefficient k. $K_n$ equals the number of the antennas of the transceiver. The first coefficient indicates the index of the transmission or reception path.

In step 604, the transceiver initializes the second coefficient n. The second coefficient indicates the index of the antenna element.

In step 606, the transceiver confirms the path for the compensation. In more detail, the transceiver determines whether to compensate for the Tx path or the Rx path.

To compensate for the Rx path, the transceiver activates the latch (e.g., the second latch 517) of the Rx path and the latch (e.g., the fourth latch 536) of the Tx path of the calibration path in step 618. At this time, the transceiver deactivates the latch (e.g., the first latch 512) of the Tx path and the latch (e.g., the third latch 535) of the Rx path of the calibration path. The transceiver controls the switches to link the Rx path and the Tx path of the calibration path.

In step 610, the transceiver generates a compensation signal to determine the phase and the magnitude so as to compensate for the Rx path.

In step 612, the transceiver stores the phase and magnitude information of the generated compensation signal and the compensation signal which passed through the Rx path, in the respective latches.

In step 614, the transceiver determines whether the phase and magnitude information of the compensation signal is confirmed with respect to the Rx path of every antenna element of the $k^{th}$ Rx path. That is, the transceiver compares the second coefficient with $N_n$.

When the phase and the magnitude information of the compensation signal of the Rx path of every antenna element is not confirmed, the transceiver increases the second coefficient in step 616.

Next, the transceiver goes back to step 606 and determines the phase and magnitude information of the compensation signal for the Rx path of the $n^{th}$ antenna element.

By contrast, when the phase and the magnitude information of the compensation signal of the Rx path of every antenna element is confirmed, the transceiver compares the phase of the values stored to the corresponding latches in step 620. For instance, for the Rx path compensation, the transceiver compares the phase stored to the latch of the Rx path with the phase stored to the latch of the Tx path of the calibration path.

In step 622, the transceiver compares the phase difference with the first threshold.

When the phase difference is greater than the first threshold, the transceiver controls the phase in step 624. In other words, the transceiver calibrates the phase in the Rx path.

When the phase difference is equal to or less than the first threshold, the transceiver compares the magnitude of the values stored to the corresponding latches in step 626. For example, to compensate for the Rx path, the transceiver compares the magnitude stored in the latch of the Rx path with the magnitude stored in the latch of the Tx path of the calibration path.

In step 628, the transceiver compares the magnitude difference with the second threshold.

When the magnitude difference is greater than the second threshold, the transceiver controls the magnitude in step 630.

When the magnitude difference is equal to or less than the second threshold, the transceiver determines whether every Rx path is calibrated in step 632.

When every Rx path is not calibrated, the transceiver updates the first coefficient in step 636. In more detail, the transceiver updates the first coefficient in order to calibrate the other Rx paths. Next, the transceiver returns to step 604 and calibrates the $k^{th}$ Rx path.

When every Rx path is calibrated, the transceiver determines whether both of the Tx path and the Rx path are calibrated in step 634.

When both of the Tx path and the Rx path are calibrated, the transceiver finishes this process.

As set forth above, the wireless communication system including the directional antenna employs a low-power power amplifier by distributing the power amplifier function to a power amplifier for each antenna element and disposes the beamformer at the front end of the power amplifier. Thus, the heat concentrated to part of the system can be distributed and beamforming can be achieved from the low power signal. Consequently, system cost can be decreased in relation with the beamformer and a more accurate beam can be formed by controlling the gain and the phase of each antenna element.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A transmitter of a wireless communication system which comprises at least one antenna, the transmitter comprising:
   a digital signal processor for processing at least one baseband digital signal; and
   at least one Radio Frequency (RF) signal processor for converting a respective baseband digital signal of the at least one baseband digital signal into an RF analog signal and for amplifying a power of the RF analog signal for at least two antenna elements of the RF signal processor through which the respective baseband signal is transmitted,
   wherein each of the at least two antenna elements includes:
      a calibrator for calibrating transmission paths of the at least two antenna elements;
      a beamformer for changing a phase and a gain of a corresponding divided signal to form a beam;
      a power amplifier for amplifying a power of a signal output from the beamformer; and
      an antenna part for radiating the power-amplified signal.

2. The transmitter of claim 1, wherein the RF signal processor comprises:
   a digital interface for converting the respective baseband digital signal into a baseband analog signal;
   an RF processor for converting the baseband analog signal into an RF analog signal;
   a divider for dividing the RF analog signal on the basis of the at least two antenna elements; and
   the at least two antenna elements.

3. The transmitter of claim 1, wherein the beamformer changes the phase of the signal sent over the antenna part into a phase for a horizontal beamforming, and
   the beamformer changes the phase of the signal sent over the at least two antenna elements, into a phase for a vertical beamforming.

4. The transmitter of claim 1, wherein the digital signal processor changes the phase of the signal sent over the at least one antenna into a phase for a horizontal beamforming, and
   the RF signal processor changes the phase of the signal sent over the at least two antenna elements, into a phase for a vertical beamforming.

5. The transmitter of claim 1, wherein the calibrator comprises:
   a controller for providing a compensation signal generated to calibrate the transmission path, to the RF signal processor, and for generating a phase and a gain for compensating for the transmission path by comparing a compensation signal provided through a calibration receiver with the generated compensation signal;
   a combiner for combining at least two compensation signals coupled at the at least two antenna elements of the RF signal processor; and
   the calibration receiver for converting the combined signal into a baseband digital signal.

6. The transmitter of claim 5, wherein the combiner comprises:
   one or more combining parts for combining compensation signals coupled at the at least two antenna elements as a single signal for the at least one antenna.

7. The transmitter of claim 6, wherein the calibrator further comprises:
   a switch for connecting a signal provided from a combining part connected to the calibrated antenna among the combining parts, to the calibration receiver.

8. The transmitter of claim 1, wherein the beamformer changes a phase and a gain of a transmission signal using the phase and the gain generated at the calibrator.

9. A method for forming a beam in a wireless communication system which comprises at least one antenna having at least two antenna elements, the method comprising:
   for each of the at least two antenna elements, generating a phase for the beamforming by calibrating a transmission signal corresponding to each of the at least two antenna elements;
   changing a phase for forming at least one of a horizontal beam and a vertical beam of a signal to be transmitted over each of the at least two antenna elements using the generated phase; and
   amplifying a power of the phase-changed signal corresponding to each of the at least two antenna elements,
   wherein the calibration of the transmission signal comprises calibrating a transmission path and a reception path with respect to each of the at least two antenna elements.

10. The method of claim 9, wherein the phase changing comprises:
    changing a phase for forming a horizontal beam of a signal to be transmitted over each of the at least two antenna elements using the generated phase; and
    changing a phase for forming a vertical beam of a signal for each of the at least two antenna elements using the generated phase.

11. The receiver of claim 10, wherein the changing of the phase for forming a vertical beam comprises:
    dividing the phase-changed transmission signal for horizontal beamforming to each of the at least two antenna elements; and
    changing the phase for vertical beamforming of the signal on the basis of each of the at least two antenna elements.

12. The receiver of claim 9, wherein the amplifying of the power comprises:
    amplifying the phase-changed signal for each of the at least two antenna elements.

* * * * *